(12) United States Patent
Chen et al.

(10) Patent No.: US 10,867,616 B2
(45) Date of Patent: *Dec. 15, 2020

(54) NOISE MITIGATION USING MACHINE LEARNING

(71) Applicant: Cisco Technology, Inc., San Jose, CA (US)

(72) Inventors: Eric Chen, Palo Alto, CA (US); Asbjørn Therkelsen, Nesbru (NO); Espen Moberg, Nesøya (NO); Wei-Lien Hsu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,059

(22) Filed: Oct. 10, 2019

(65) Prior Publication Data
US 2020/0043509 A1  Feb. 6, 2020

Related U.S. Application Data (63) Continuation of application No. 16/012,565, filed on Jun. 19, 2018, now Pat. No. 10,446,170.

(51) Int. Cl.
*G10L 21/0216* (2013.01)
*G10L 25/30* (2013.01)
(Continued)

(52) U.S. Cl.
CPC .......... *G10L 21/0216* (2013.01); *G06F 17/18* (2013.01); *G06N 7/00* (2013.01); *G06N 20/00* (2019.01); *G10L 25/30* (2013.01)

(58) Field of Classification Search
CPC . G10L 21/0216; G10L 25/30; G10L 21/0208; G06N 20/00; G06N 7/00; G06F 17/18; H04R 2227/009
See application file for complete search history.

(56) References Cited

U.S. PATENT DOCUMENTS 5,185,848 A  2/1993 Aritsuka et al.
5,970,064 A  10/1999 Clark et al.
(Continued)

FOREIGN PATENT DOCUMENTS

CN  102004671  3/2013
WO  WO 2017/106454 A1  6/2017

OTHER PUBLICATIONS

International Search Report and Written Opinion from the International Searching Authority, dated Sep. 16, 2019, 14 pages, for corresponding International Patent Application No. PCT/US2019/037518.

(Continued)

*Primary Examiner* — Stella L. Woo
(74) *Attorney, Agent, or Firm* — Polsinelli PC (57) ABSTRACT

This disclosure relates to solutions for eliminating undesired audio artifacts, such as background noises, on an audio channel. A process for implementing the technology can include receiving a set of audio segments, analyzing the segments using a first ML model to identify a first probability of unwanted background noises in the segments, and if the first probability exceeds a threshold, analyzing the segments using a second ML model to determine a second probability that the one or more background features exist in the segments. In some aspects, the process can include attenuating audio artifacts in the segments, if the second probability exceeds a second threshold. In some implementations, dynamic time stretching and shrinking can be applied to the noise attenuation. Systems and machine-readable media are also provided.

17 Claims, 5 Drawing Sheets

(51) Int. Cl.
*G06F 17/18* (2006.01)
*G06N 7/00* (2006.01)
*G06N 20/00* (2019.01)

(56) References Cited

U.S. PATENT DOCUMENTS

| | | | |
|---|---|---|---|
| 6,115,393 A | 9/2000 | Engel et al. |
| 6,298,351 B1 | 10/2001 | Castelli et al. |
| 6,597,684 B1 | 7/2003 | Gulati et al. |
| 6,697,325 B1 | 2/2004 | Cain |
| 6,721,899 B1 | 4/2004 | Narvaez-Guarnieri et al. |
| 6,894,714 B2 | 5/2005 | Gutta et al. |
| 6,954,617 B2 | 10/2005 | daCosta |
| 7,185,077 B1 | 2/2007 | O'Toole et al. |
| 7,453,864 B2 | 11/2008 | Kennedy et al. |
| 7,496,650 B1 | 2/2009 | Previdi et al. |
| 7,826,372 B1 | 11/2010 | Mabe et al. |
| 8,059,557 B1 | 11/2011 | Sigg et al. |
| 8,063,929 B2 | 11/2011 | Kurtz et al. |
| 8,154,583 B2 | 4/2012 | Kurtz et al. |
| 8,274,893 B2 | 9/2012 | Bansal et al. |
| 8,385,355 B1 | 2/2013 | Figueira et al. |
| 8,489,765 B2 | 7/2013 | Vasseur et al. |
| 8,620,840 B2 | 12/2013 | Newnham et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1 | 4/2014 | Jenkins et al. |
| 8,767,716 B2 | 7/2014 | Trabelsi et al. |
| 8,774,164 B2 | 7/2014 | Klein et al. |
| 8,842,161 B2 | 9/2014 | Feng et al. |
| 8,856,584 B2 | 10/2014 | Matsubara |
| 8,862,522 B1 | 10/2014 | Jaiswal et al. |
| 8,880,477 B2 | 11/2014 | Barker et al. |
| 8,942,085 B1 | 1/2015 | Pani et al. |
| 9,324,022 B2 | 4/2016 | Williams, Jr. et al. |
| 9,338,065 B2 | 5/2016 | Vasseur et al. |
| 9,553,799 B2 | 1/2017 | Tarricone et al. |
| 9,558,451 B2 | 1/2017 | Nilsson et al. |
| 9,608,889 B1 * | 3/2017 | Lundin ............... H04L 43/0829 |
| 9,614,756 B2 | 4/2017 | Joshi |
| 9,779,755 B1 | 10/2017 | Kay et al. |
| 9,886,954 B1 * | 2/2018 | Meacham ............. G10L 15/063 |
| 10,446,170 B1 * | 10/2019 | Chen ........................ G06N 7/00 |
| 2002/0061001 A1 | 5/2002 | Garcia-Luna-Aceves et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0159386 A1 | 10/2002 | Grosdidier et al. |
| 2003/0005149 A1 | 1/2003 | Haas et al. |
| 2003/0061340 A1 | 3/2003 | Sun et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0225549 A1 | 12/2003 | Shay et al. |
| 2004/0153563 A1 | 8/2004 | Shay et al. |
| 2004/0218525 A1 | 11/2004 | Elie-Dit-Cosaque et al. |
| 2005/0111487 A1 | 5/2005 | Matta et al. |
| 2005/0114532 A1 | 5/2005 | Chess et al. |
| 2005/0143979 A1 | 6/2005 | Lee et al. |
| 2006/0072471 A1 | 4/2006 | Shiozawa |
| 2006/0083193 A1 | 4/2006 | Womack et al. |
| 2006/0116146 A1 | 6/2006 | Herrod et al. |
| 2006/0133404 A1 | 6/2006 | Zuniga et al. |
| 2007/0071030 A1 | 3/2007 | Lee |
| 2007/0083650 A1 | 4/2007 | Collomb et al. |
| 2007/0120966 A1 | 5/2007 | Murai |
| 2007/0149249 A1 | 6/2007 | Chen et al. |
| 2007/0192065 A1 | 8/2007 | Riggs et al. |
| 2008/0049622 A1 | 2/2008 | Previdi et al. |
| 2008/0089246 A1 | 4/2008 | Ghanwani et al. |
| 2008/0140817 A1 | 6/2008 | Agarwal et al. |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0073988 A1 | 3/2009 | Ghodrat et al. |
| 2009/0129316 A1 | 5/2009 | Ramanathan et al. |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0271467 A1 | 10/2009 | Boers et al. |
| 2009/0303908 A1 | 12/2009 | Deb et al. |
| 2010/0046504 A1 | 2/2010 | Hill |
| 2010/0165863 A1 | 7/2010 | Nakata |
| 2011/0082596 A1 | 4/2011 | Meagher et al. |
| 2011/0116389 A1 | 5/2011 | Tao et al. |
| 2011/0149759 A1 | 6/2011 | Jollota |
| 2011/0228696 A1 | 9/2011 | Agarwal et al. |
| 2011/0255570 A1 | 10/2011 | Fujiwara |
| 2011/0267962 A1 | 11/2011 | J S A et al. |
| 2011/0274283 A1 | 11/2011 | Athanas |
| 2012/0075999 A1 | 3/2012 | Ko et al. |
| 2012/0163177 A1 | 6/2012 | Vaswani et al. |
| 2012/0213062 A1 | 8/2012 | Liang et al. |
| 2012/0213124 A1 | 8/2012 | Vasseur et al. |
| 2012/0307629 A1 | 12/2012 | Vasseur et al. |
| 2012/0321095 A1 | 12/2012 | Hetherington et al. |
| 2013/0003542 A1 | 1/2013 | Catovic et al. |
| 2013/0010610 A1 | 1/2013 | Karthikeyan et al. |
| 2013/0028073 A1 | 1/2013 | Tatipamula et al. |
| 2013/0070755 A1 | 3/2013 | Trabelsi et al. |
| 2013/0128720 A1 | 5/2013 | Kim et al. |
| 2013/0177305 A1 | 7/2013 | Prakash et al. |
| 2013/0250754 A1 | 9/2013 | Vasseur et al. |
| 2013/0275589 A1 | 10/2013 | Karthikeyan et al. |
| 2013/0311673 A1 | 11/2013 | Karthikeyan et al. |
| 2014/0049595 A1 | 2/2014 | Feng et al. |
| 2014/0126423 A1 | 5/2014 | Vasseur et al. |
| 2014/0133327 A1 | 5/2014 | Miyauchi |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0293955 A1 | 10/2014 | Keerthi |
| 2015/0023174 A1 | 1/2015 | Dasgupta et al. |
| 2015/0142702 A1 | 5/2015 | Nilsson et al. |
| 2015/0324689 A1 | 11/2015 | Wierzynski et al. |
| 2015/0340032 A1 | 11/2015 | Gruenstein |
| 2016/0005422 A1 | 1/2016 | Zad Issa et al. |
| 2016/0105345 A1 | 4/2016 | Kim et al. |
| 2016/0203404 A1 | 7/2016 | Cherkasova et al. |
| 2017/0324990 A1 | 11/2017 | Eban et al. |
| 2017/0347308 A1 | 11/2017 | Chou et al. |
| 2017/0353361 A1 | 12/2017 | Chopra et al. |
| 2018/0040333 A1 | 2/2018 | Wung et al. |
| 2018/0293995 A1 | 10/2018 | Makela et al. |
| 2018/0301157 A1 * | 10/2018 | Gunawan ............ G10L 21/0208 |

OTHER PUBLICATIONS

Akkaya, Kemal, et al., "A survey on routing protocols for wireless sensor networks" Abtract, 1 page, Ad Hoc Networks, May 2005.

Alsheikh, Mohammad Abu, et al., "Machine Learning in Wireless Sensor Networks: Algorithms, Strategies, and Applications," Mar. 19, 2015, 23 pages.

Author Unknown, "White Paper on Service Enabler Virtualization," Draft dated Nov. 9, 2015, 26 pages, Open Mobile Alliance (OMA), San Diego, CA, USA.

Baccour, Nouha, et al., "Radio Link Quality Estimation in Wireless Sensor Networks: A Survey," 2011, 35 pages.

Fan, Na, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al.: "A mobility-assisted protocol for supervised learning of link quality estimates in wireless networks," Feb. 2012, 8 pages.

(56) References Cited

OTHER PUBLICATIONS

Fortunato, Santo, "Community Detection in Graphs", arXiv:0906.0612v2 [physics.soc-ph]; Physics Reports 486, 75-174, Jan. 25, 2010, 103 pages.

Godsill, Simon, et al., "Detection and suppression of keyboard transient noise in audio streams with auxiliary keybed microphone," Abstract, 1 page, 2015 IEEE International Conference on Acoustics, Speech and Signal Processing (ICASSP), Apr. 19-24, 2015, Brisbane, Qld, Australia (Abstract available at http://ieeexplore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hradis, Michael, et al., "Voice activity detection from gaze in video mediated communication," ACM, Mar. 28-30, 2012 http://medusa.fit.vutbr.cz/TA2/TA2., 4 pages.

Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Kuklinski, Slawomir, et al., "Design Principles of Generalized Network Orchestrators," 2016 IEEE International Conference on Communications Workshops (ICC), May 23, 2016, pp. 430-435.

Liu, Tao, et al., "Data-driven Link Quality Prediction Using Link Features," ACM Transactions on Sensor Networks, Feb. 2014, 35 pages.

Mckenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingMachineLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmat/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkami V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 page, 2017 $22^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

\* cited by examiner

NOISE MITIGATION USING MACHINE LEARNING

CROSS-REFERENCE TO RELATED APPLICATION

This application is a continuation of U.S. patent application Ser. No. 16/012,565 filed on Jun. 19, 2018, the contents of which is incorporated by reference in its entirety.

TECHNICAL FIELD

The subject technology relates to systems and methods for reducing background noise and in particular, for deploying machine learning models to detect and attenuate unwanted background noises (audio artifacts) in teleconference and videoconference settings.

INTRODUCTION

Passive noise control techniques such as earplugs, thick walls, and sound-absorbing ceiling tiles are well known. However, such passive solutions are undesirable for many situations in which noise cancellation or suppression is desired as they can be uncomfortable, bulky, unsightly, or ineffective. More recently, active noise cancellation (ANC) techniques have been developed whereby a speaker emits a sound wave designed to cancel out offensive noise via destructive interference.

However, legacy ANC technologies are limited in applicability. They are suitable only for small enclosed spaces, such as headphones, or for continuous or highly periodic low frequency sounds, such as machinery noise. Further, due in part to a dependency on complex signal processing algorithms, many ANC technologies are limited cancelling noise that comprises a small range of predictable frequencies (e.g., relatively steady-state and low-frequency noise).

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology; however, it will be clear and apparent that the subject technology is not limited to the specific details set forth herein and may be practiced without these details. In some instances, structures and components are shown in block diagram form in order to avoid obscuring certain concepts.

Overview

Existing active noise cancellation techniques are ineffective in many situations where it is desirable to reduce noise, such as in public spaces, outdoor areas, or near highways or airports, etc. Passive noise reduction (e.g., noise blocking/absorption) is typically used for these situations, but passive approaches have limited bandwidth and when used incorrectly, can result in acoustically unpleasant conditions, such as an overly damped ("dead") sounding room. Thus, passive and currently available active noise cancellation techniques are unsuitable for many situations where noise cancellation is desirable.

In some environments, it is possible to use machine learning (ML) models (classifiers) to identify and selectively eliminate undesired noises on an audio channel. However, high-accuracy ML models are computationally expensive to deploy and can therefore be difficult to implement in real-time and on light-weight computing devices used for transmitting audio communications, such as smartphones, and Internet Protocol (IP) telephony devices.

The disclosed technology addresses the forgoing limitations of ML noise filtering techniques by providing a multi-layered ML based solution for detecting and attenuating unwanted audible features (background noises or audio artifacts). Aspects of the technology address the limitations of deploying high-accuracy ML models by utilizing computationally inexpensive (light weight) preliminary classifiers to reduce the detection of false-positives. By realizing significant reductions in false-positive noise detections, additional higher-accuracy ML models can be implemented to accurately classify remaining background (sound) features.

A process of the disclosed technology can include a computer-implemented method for receiving a first set of audio segments from an audio capture device, analyzing the first set of audio segments using a first machine learning model to identify a first probability that one or more background (noise) features exist in the first set of audio segments, and if the first probability exceeds a first predetermined threshold, analyzing the first set of audio segments using a second machine learning model to determine a second probability that the one or more background features exist in the first set of audio segments. In some aspects, the process can further include steps for attenuating at least one of the one or more background features if the second probability exceeds a second predetermined threshold.

Description

Using machine learning (ML) models it is possible to accurately detect (classify) unwanted audio artifacts on an audio channel, and to perform the signal processing necessary to attenuate the noises in a manner that is undetectable by the human ear. As such, ML models can be used to identify unwanted background noises (e.g., sirens, typing sounds, crying babies, etc.), and to remove the noises from communication channels, such as in a teleconference or videoconference settings. As discussed above, one limitation of conventional ML approaches to noise mitigation is that fast and accurate noise classification can be computationally expensive, making it difficult to deploy such technologies in-line with legacy telephony equipment.

The disclosed technology addresses the computational limitations of deploying high-accuracy ML models by using a multi-layered approach. As discussed in further detail below, sounds having a low-probability of being background noises can be quickly filtered using a light-weight preliminary (first) ML model. By reducing the set of total sound events to be processed/classified, higher-probability background events can be efficiently screened using a subsequent (second) ML model that is more accurate and robust than the first ML model. As discussed in further detail below, noise filtering using a multi-layered ML approach can be implemented based on assigned classification probabilities.

In some approaches, probabilities are assigned to audible events, e.g., designating their respective probability for constituting unwanted background noises. Audible events associated with noise-classification probabilities below a predetermined threshold can be ignored, whereas events with noise-classification probabilities above the threshold are provided to a second (more accurate) ML model for additional filtering. The second ML model, which performs a more accurate (and computationally expensive) classification, can be used to assign a second noise-classification probability to each background features. Subsequently, those features associated with noise-classification probabilities exceeding a second threshold can be selected for removal/attenuation.

Attenuation for positively identified noise events (unwanted background artifacts) can be based on associated event probabilities. For example, sound events associated with higher noise-classification probabilities can be more greatly attenuated than events associated with lower noise-classification probabilities. Additionally, as further discussed below, attenuated noises can be buffered, such that at a time when desired sounds (e.g., user speech noises) are detected, the desired sound can be inserted into the audio channel, for example, using "time squeezing" and played at a normal volume level. As such, sounds at the beginning of words or sentences are not inadvertently attenuated, thereby improving the overall intelligibility human speech.

It is understood that the described techniques can be applied to a variety of machine learning and/or classification algorithms, and that the scope of the technology is not limited to a specific machine learning implementation. By way of example, implementations of the technology can include the deployment of multi-layered ML models based on one or more classification algorithms, including but not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, or the like.

In some aspects, ML models can be configured to perform various types of regression, for example, using one or more regression algorithms, including but not limited to: a Stochastic Gradient Descent Regressor, and/or a Passive Aggressive Regressor, etc. ML models can also be based on clustering algorithms (e.g., a Mini-batch K-means clustering algorithm), a recommendation algorithm (e.g., a Miniwise Hashing algorithm, or Euclidean LSH algorithm), and/or an anomaly detection algorithm, such as a Local outlier factor. Additionally, ML models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 1:
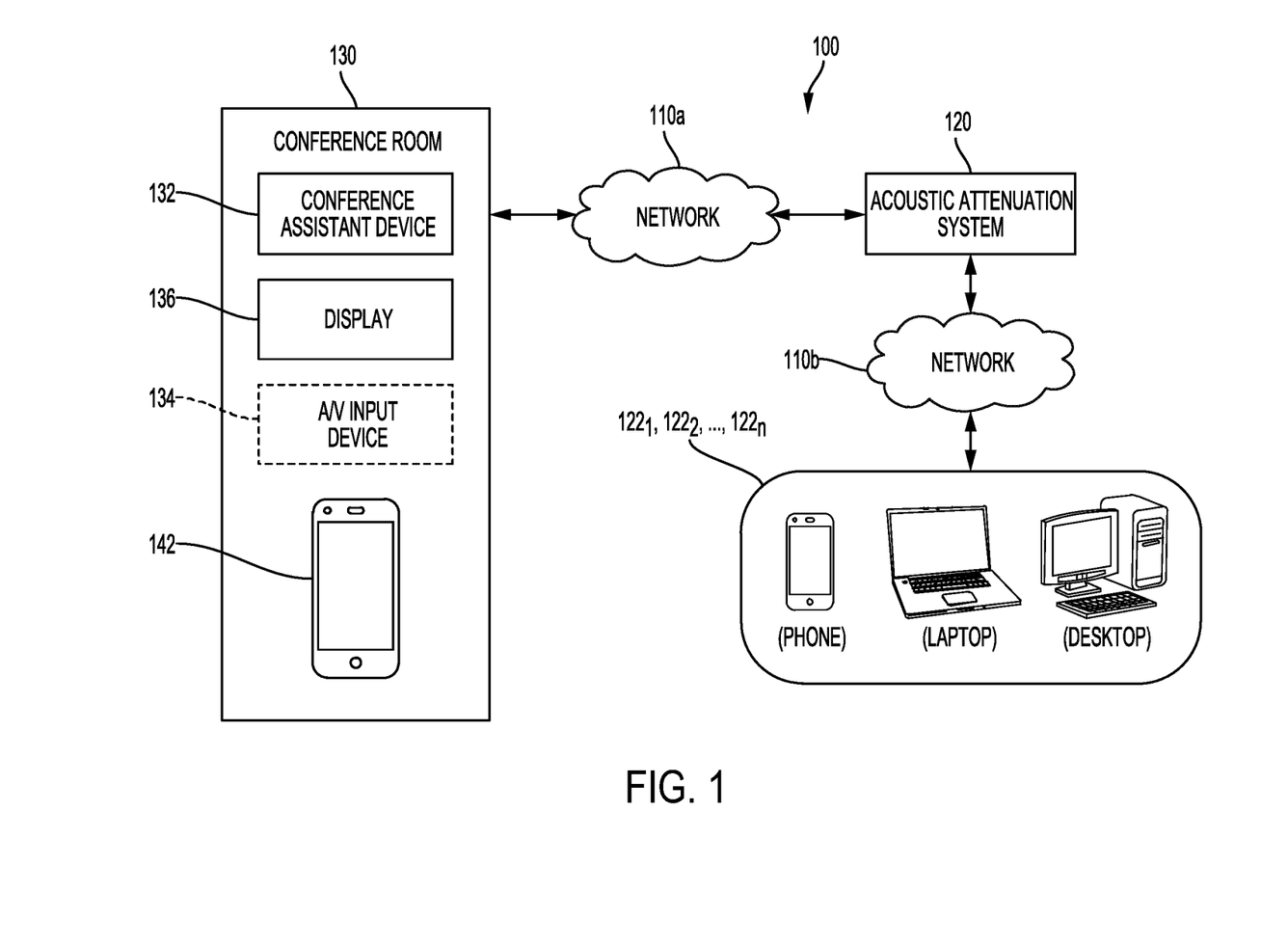
FIG. 1 conceptually illustrates an example environment in which some aspects of the technology can be implemented.

FIG. 1 conceptually illustrates an example environment in which some aspects of the technology can be implemented. Specifically, FIG. 1 provides a block diagram of an environment for providing conferencing capabilities. Although FIG. 1 illustrates client-server network environments 100a/b, other embodiments of the technology can include other configurations including, for example, peer-to-peer environments.

FIG. 1 illustrates an acoustic attenuation system 120 that is implemented in a communication path between various communication devices (e.g., $122_1$, $122_2$, ... $122_n$, and 142) located at various geographic locations, such as through deployment on one or more networks 110a, 100b. Communication devices (e.g., $122_1$, $122_2$, ... $122_n$, and 142) can take any from factor, such as a portable device, laptop, desktop, tablet, etc. In FIG. 1, conference room 130 is in one such location containing portable device 142. However, as will be appreciated by those skilled in the art that communication devices (e.g., $122_1$, $122_2$, ... $122_n$) do not necessarily need to be in a specific or common geographic location (room). Additionally, although acoustic attenuation system 120 is illustrated as being connected to the communication devices via a network (e.g., networks 110a/b), it is understood that attenuation system 120 can be locally implemented with respect to any of the described communication devices. For example, acoustic attenuation system may be connected directly to one or more of communication devices $122_1$, $122_2$, ... $122_n$ and/or locally coupled to portable device 142, for example, via one or more components provided in conference room 130, e.g., device assistant 132, or audio/video (A/V) input device 134, etc.

As further illustrated in FIG. 1, conference room 130 includes a conference assistant device 132, a display input device 134, and a display 136. Display 136 can be a monitor, a television, a projector, a tablet screen, or other visual device that may be used during a conferencing session. Display input device 134 is configured to interface with display 136 and provide the conferencing session input for display 136. Display input device 134 may be integrated into display 136 or separate from display 136, for example, through communication with display 136 via a Universal Serial Bus (USB) interface, a High-Definition Multimedia Interface (HDMI) interface, a computer display standard interface, e.g., Video Graphics Array (VGA), Extended Graphics Array (XGA), etc., a wireless interface, e.g., Wi-Fi, infrared, Bluetooth, etc., or the like.

Conference assistant device 132 is configured to coordinate with the other devices in conference room 130 to start and maintain a conferencing session. For example, conference assistant device 132 may interact with portable device 142 associated with one or more users to facilitate a conferencing session, either directly or via networks 110a/b.

Portable device 142 may be, for example, a smart phone, tablet, laptop, or other computing device. Portable device 142 may have an operating system and run one or more collaboration service applications that facilitate conferencing or collaboration, and interaction with conference assistant device 132. In practice, networks 110a/b can be configured to support communications between users of any of devices $122_1$, $122_2$, ... $122_n$, and 142. In some approaches, acoustic attenuation system 120 is configured to identify and mitigate unwanted background noises on an audio channel provided by networks 110a/b during such communications.

In particular, acoustic attenuation system 120 can include hardware and software modules necessary to implement a multi-layered machine-learning noise mitigation process of the disclosed technology. Attenuation system 120 can be configured to intercept real-time audio segments of audio information transmitted between two or more of devices 122₁, 122₂, . . . 122ₙ, and 142. The audio segments are analyzed using a preliminary (first) ML model, which assigns a first (noise-classification) probability to background features (sounds) in the audio segments. The noise-classification probabilities for each background feature correspond with a probability that the associated feature (noise) is an undesired audio artifact.

In some aspects, the first probabilities calculated for each sound event can be used to filter low-probability background features, i.e., to remove sounds that have a low probability of being background noises. To perform filtering, each sound event associated with a probability less than a predetermined threshold amount can be ignored. By way of example, sound events that fall below a 30% chance of constituting unwanted background noises can be ignored. On the other hand, sound events associated with a probability that is greater than the predetermined threshold may be provided to a secondary ML model. Further to the above example, sound events having a greater than 30% chance of constituting unwanted background noises may be provided to a second ML model.

As discussed in further detail below, the second ML model can provide higher accuracy classification as compared to the first ML model. The second ML model, therefore, can process each sound event and assign a second probability to each event, i.e., corresponding with a probability that the event constitutes an unwanted background noise. As in the above example, sound events associated with probabilities exceeding a second (predetermined) threshold) can be selected for attenuation, whereas sound events that do not exceed the second threshold can be identified as constituting normal speech and ignored.

Figure 2:
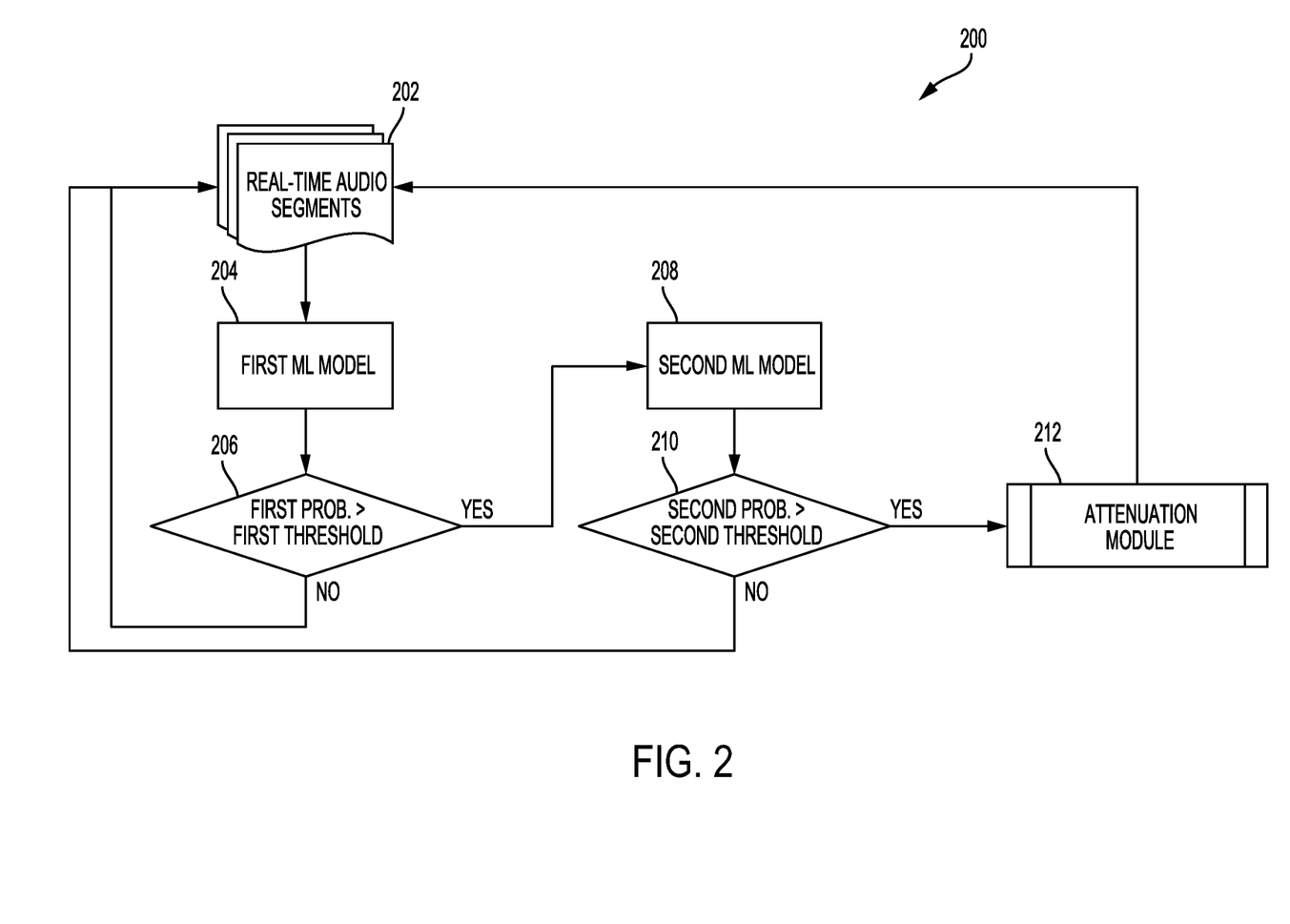
FIG. 2 illustrates a flow diagram of an example process for implementing a machine-learning (ML) based noise-attenuation process of the disclosed technology.

FIG. 2 illustrates an example process 200 for implementing a multi-layered ML noise-attenuation technique of the disclosed technology. Process 200 begins when audio segments are generated from a sound signal (202). Audio segments can be generated from sampling a noise signal provided, for example, from an audio capture device or other device. Although aspects of the technology are contemplated for deployment in a telecommunications setting (e.g., in an audio channel of a teleconference or video conference), the disclosed technology is not limited to such implementations, as such, the audio segments may originate from virtually any audio capture device, such as an A/V interface, a portable electronic device, and/or conference assistant device, as discussed above, without departing from the scope of the technology.

The audio segments each represent an interval of sound data, such as 1 second audio clips. Audio segments can be sampled from audio information passing over a communications channel, for example, as between two or more of devices 122₁, 122₂, . . . 122ₙ, and 142, discussed above. In some aspects, the audio segments represent samples taken at sliding time intervals, such as 1 second segments sampled every 10 ms. Audio segment lengths and sampling rates (temporal segment spacing) can vary, depending on the desired implementation.

After the real-time audio segments are generated, the segments are provided to a first ML model (204). The first ML model can be implemented using software and/or hardware modules deployed on any device coupled to, or configured to receive, audio segments from an audio channel. In some approaches, the first ML model is a relatively light-weight (computationally inexpensive) classifier configured to quickly evaluate audio features contained in the received audio segments. As discussed above, the first ML model can be configured to associate background (sound) features detected in the audio segments with probabilistic indicators that those features represent unwanted background noises. As such, the first ML model can function as a classifier-based filter.

In some aspects, the first ML model can associate each background feature in the audio segments with a probability score, such as 0.05, to indicate a 5% chance that the background feature represents an undesired background noise, or 0.80 to indicate an 80% chance that the background feature represents an undesired noise. In some aspects, probability scores may be appended to audio segment data, for example, as metadata tags. In other aspects, probability scores may be stored to an associative memory structure, such as a database or table.

Subsequently, the audio segments are evaluated to determine if the detected background features can be ignored, e.g., if they have a low probability of constituting unwanted background noises (206). Filtering of irrelevant background features is performed using a probability threshold. For example, probability scores assigned by the first ML model can be compared against a (first) predetermined threshold. Background events associated with probability scores below the (first) threshold are deemed to have a low chance of being unwanted background noises, and can be ignored (return to 202). However, background events associated with probability scores above the (first) threshold can be selected for further analysis using a second ML model (208).

The second ML model can be a classifier having greater noise detection accuracy than the first ML model. As such, the second ML model can be computationally more expensive to operate. However, the second ML model receives a smaller total number background features because a significant number are filtered by the first ML model. As a result, the second ML model can be deployed and implemented in real-time communications, without disrupting or distorting audio exchange. The second ML model can be configured to analyze received audio segments and to assign second set of probability scores to each identified background (sound) events, e.g., to quantitatively indicate a probability that the corresponding event is an unwanted background noise (208).

Probabilities assigned by the second ML model for each of the background sound features can be compared to a second threshold to determine if noise attenuation should be performed for that background feature (210). If the probability associated with the background feature is less than the second threshold, then the sound may be ignored, i.e., no action is taken (202). Alternatively, if the probability associated with the background feature is greater than the second predetermined threshold, then the background event may be reduced in volume (dB) using an attenuation module (212). In some approaches, the attenuation module can perform on-the fly signal processing for the corresponding audio segment such that there is no loss or distortion in audio quality. As such, background noises can be effectively filtered in real-time (or near real-time) such that user experience is improved by removal of extraneous background noises, but not negatively affected by audio delays.

It is understood that the thresholds (e.g., the first threshold and second threshold) may be automatically configured, or manually set, for example, by a system administrator or by default system settings. In some aspects, the first/second threshold may be tuned or adjusted based on considerations of accuracy and user experience. The amount of amplitude attenuation for a particular background sound feature can be based on the probability assigned by the second ML model. That is, for background features for which there is a high-confidence that the sound is an unwanted background noise (a high probability), attenuation can be greater than for background features for which there is a lower-confidence (lower associated probability).

Figure 3:
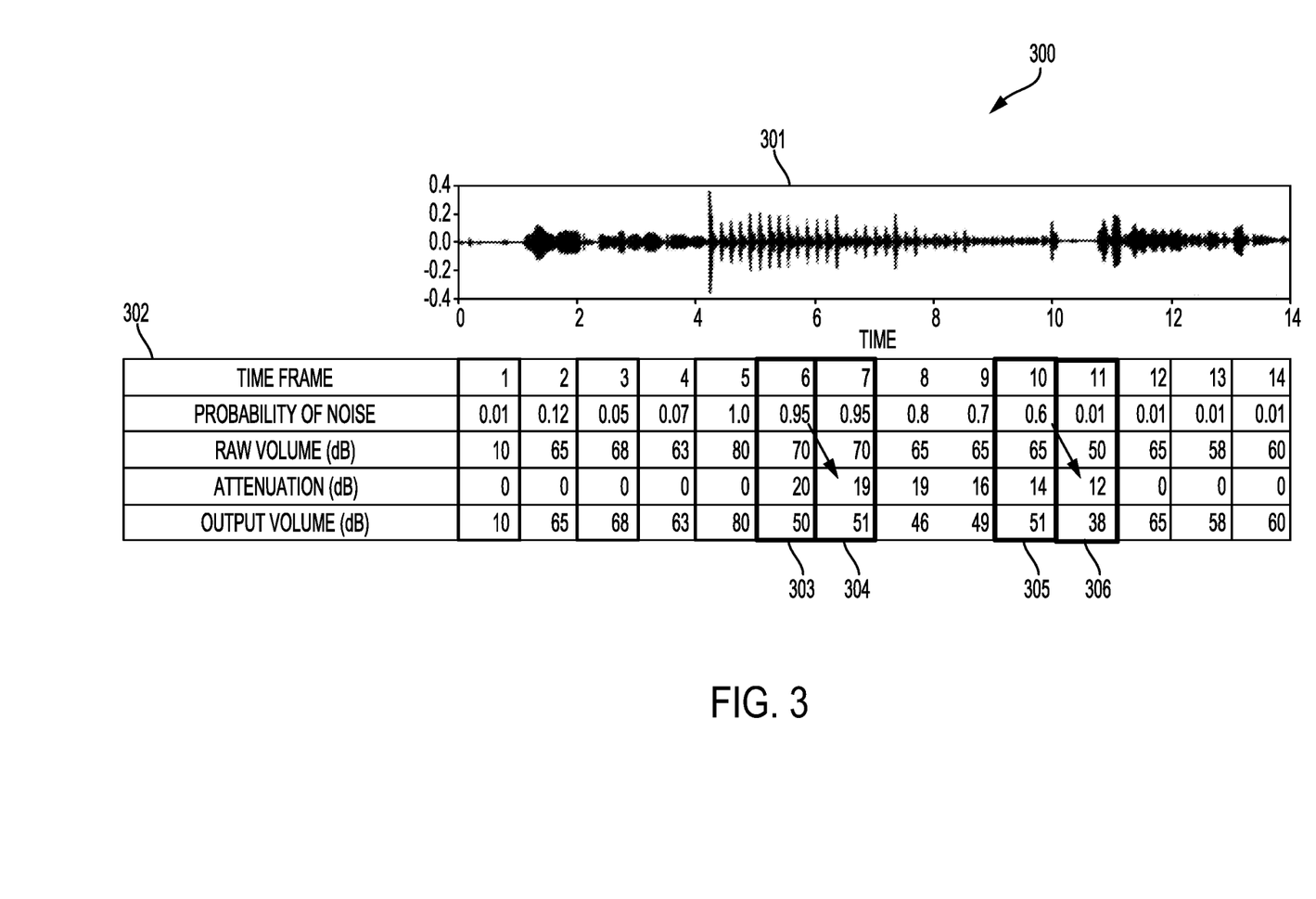
FIG. 3 illustrates a table associating attenuation quantities (dB) with noise-detection probabilities, according to some aspects of the technology.

As discussed in further detail with respect to FIG. 3, attenuation can be applied to a subsequent audio segment based on an unwanted noise probability computed for a current segment. In such approaches, all background events from the audio segments may be buffered. When desired speech/noises are detected, the buffered segment can be re-inserted into the audio channel at its proper time at full volume i.e., by removing the delay and thereby time squeezing the sound into the audio channel. By placing desired sounds into the audio stream in at their chronological time, and at full volume (attenuation removed), sounds at the beginning of words/sentences can be preserved, thereby improving the user experience.

FIG. 3 illustrates an example timing diagram 300 of a pressure wave including sound events 301 that are juxtaposed with a table of statistics 302 for different timeframes. Specifically, table 302 illustrates various characteristics relating to the sound events 301, including: noise probabilities, raw volume (dB), attenuation (dB), and output volume (dB). Statistical characteristics for the sound events 301 are organized by time frame, that is, chronologically in 1 second non-overlapping time segments. However, as discussed above, the time frames and corresponding audio segments can be of virtually any duration, and may overlap. For example, the time frames may be organized as half-second intervals that are sampled every 10 ms.

The example of FIG. 3 illustrates how a noise-attenuation process can be performed using background noise probability scores. That is, sounds (background features) having a higher probability of being unwanted background noises can be more greatly attenuated than those having a lower probability. In the example of FIG. 3, columns 303, 304, 305, and 306 illustrate statistics captured at time frames 6, 7, 10, 11 respectively. As illustrated, noise probability, raw volume, attenuation, and output volume statistics are provided for the corresponding sound event in the respective time frame.

As discussed in further detail below, noise attenuation can be performed on the fly (in real-time) or performed after a pre-determined offset. Delaying attenuation of background noises can help preserve speech quality, for example, by avoiding attenuation of sounds that occur at the beginning of words or syllables. By way of example, in column 303, corresponding with time frame 6 (column 303), the probability of unwanted background noise for sounds in the corresponding time frame is 0.95 or 95%. Due to an attenuation delay between time frames 6 and 7 (column 304), an attenuation of 19 dB is applied in time frame 7, based on the noise probability calculated in time frame 6 (e.g., 95%). As such, in time frame 7, the raw volume of 70 dB is reduced to an output volume of 51 dB.

In this approach, sounds existing in frame 6 (303) and frame 7 (304) can be buffered. Thus, if sounds in frame 7 (304) are attenuated, but include sounds that should not be attenuated, such as normal speech sounds, then frame can be inserted into the audio channel with the delay (and attenuation) removed. That is, the original sounds contained in frame 7 can be preserved and provided at full volume in their proper chronological time, favoring the preservation of purposeful sound events over the attenuation of unwanted background noise.

In another example, time frame 10 (305) and time frame 11 (306) correspond with sounds that have low probabilities of constituting unwanted background noises, relative to time frame 6 and 7. For example, in time frame 10 (305), the probability of the corresponding sound constituting unwanted background noise is 0.6, or 60%. As a result, attenuation of the sound volume applied in time frame 11 (306) is only 12 dB, reducing the raw volume for that time frame from 50 dB to 38 dB at output. In some approaches, where the noise probability is exceedingly low, no attenuation is performed. For example, as illustrated in table 302, the noise probability in frame 11 (306) is very low, i.e., 0.01 or 1%—the resulting noise attenuation in subsequent frame 12 is 0 dB.

The probability of noise for each time frame in table 302 can be a numeric value assigned to an audio segment (time frame) using a ML model, such as second ML model 208, discussed above. However, it is understood that implementations of the disclosed noise reduction technology are not limited to two-layer ML architectures. For example, three or more ML models or classifiers can be implemented, without departing from the scope of the technology.

Figure 4:
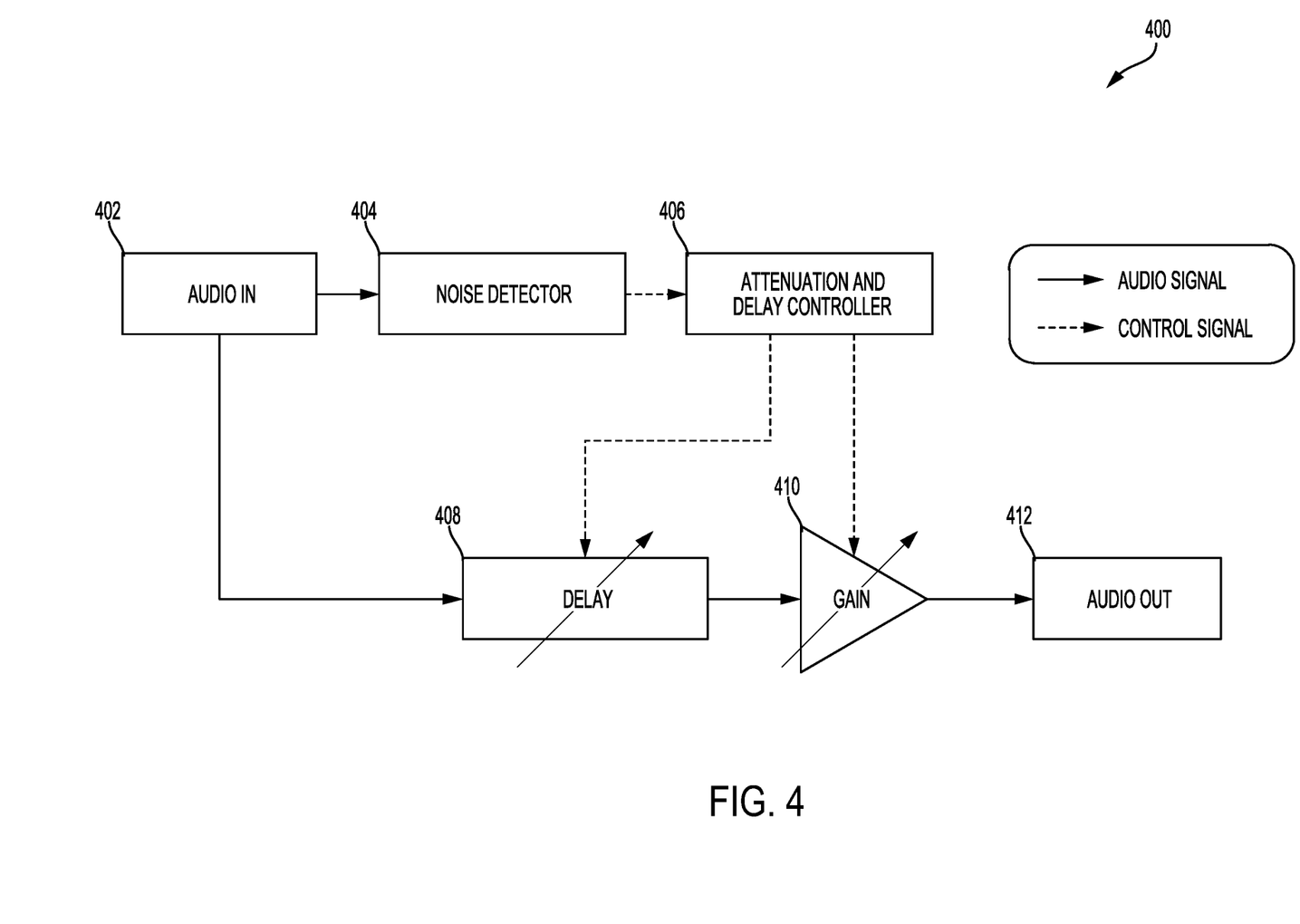
FIG. 4 illustrates a block diagram of example hardware components that can be used to implement a noise-attenuation delay, according to some aspects of the technology.

FIG. 4 illustrates a block diagram of example hardware components of a system 400 that can be used to implement an audio attenuation delay, according to some aspects of the technology. System 400 includes an audio input module 402 (audio in) that is coupled to a noise detector 404 and a signal delay module 408. Noise detector 404 is additionally coupled to an attenuation and delay controller 406 that, in turn, is coupled to both signal delay module 408 and an amplifier 410.

In practice, audio signals, such as audio segments received from an audio capture device, are provided by audio input module 402 to noise detector 404 and signal delay module 408. Noise detector 404 can be configured to implement a multi-layered ML model, discussed above. For example, noise detector 404 may include software, firmware, and/or hardware used to implement a process similar to process 200, discussed with respect to FIG. 2.

Detection of unwanted background noises (e.g., the identification of background features with high noise probabilities) can be indicated to attenuation and delay controller 406 by noise detector 404. Attenuation and delay controller 406 is configured to provide control signals to delay module 408 and amplifier 410 to selectively delay and background features that are identified as high-probability background noises. For example, for a given audio segment, attenuation of an identified background noise can be performed by delay module 408 and amplifier 410, such that volume attenuation is performed gradually. By increasing attenuation over time, device 400 can help to maintain, the fidelity of natural human speech sounds, for example, by preserving the volume of all noises occurring at the beginning of a word or syllable.

Figure 5:
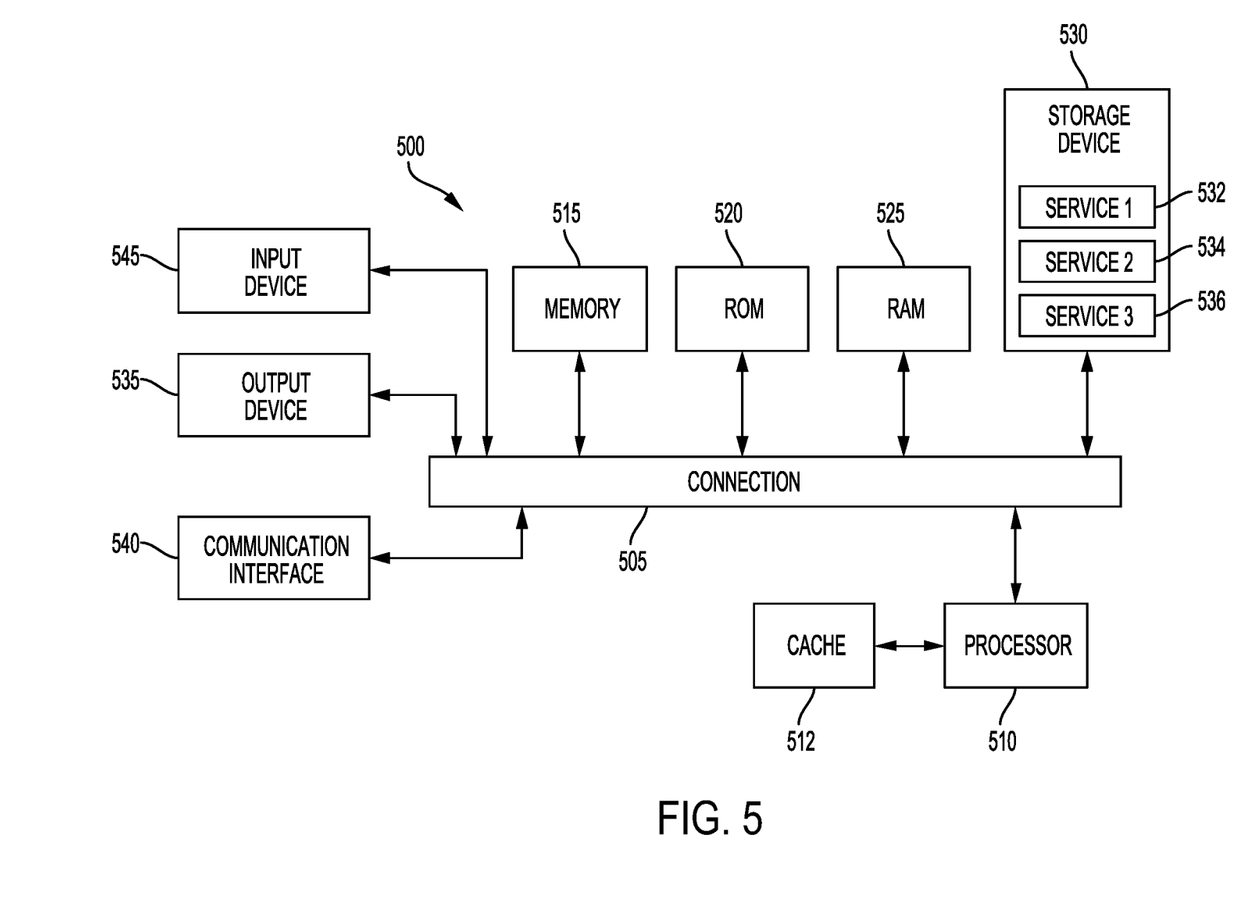
FIG. 5 illustrates example hardware components that can be used to implement some aspects of the subject technology.

FIG. 5 illustrates an example device 500 that can be used to implement a noise-reduction technique of the subject technology. Device 500 includes multiple hardware components that are communicatively connected via connection 505, which can be a physical bus, and provides a direct connection into processor 510, such as in a chipset architecture. Connection 505 can also represent a virtual connection, networked connection, or logical connection.

Device 500 can be a distributed system that performs functions described in this disclosure can be distributed within a datacenter, multiple datacenters, a peer network, etc. Depending on the desired implementation, one or more of the described system components can represent one or more such components, each performing some or all of the functions for which the component is described. Additionally, the components can be physical or virtual devices, such as virtual machines (VMs) or networking containers.

Device 500 includes at least one processing unit (CPU or processor) 510 and connection 505 that couples various system components, including system memory 515, such as read only memory (ROM) and random access memory (RAM), to processor 510. Device 500 can include a cache of high-speed memory connected directly with, in close proximity to, or integrated as part of processor 510. Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 can be a self-contained computing system, containing multiple cores or processors, a bus, memory controller, cache, etc. A multi-core processor can be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500.

Device 500 can include communications interface 540, which can generally govern and manage the user input and system output. Communications interface 540 can include one or more wired or wireless network interfaces, for example, that are configured to facilitate network communications between one or more computer networks and device 500. There is no restriction on operating on any particular hardware arrangement and therefore the basic features here may easily be substituted for improved hardware or firmware arrangements as they are developed. Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/ or some combination of these devices. Storage device 530 can include software services, servers, services, etc., that when the code that defines such software is executed by the processor 510, it causes the system to perform a function. In some aspects, a hardware service that performs a particular function can include the software component stored in a computer-readable medium in connection with the necessary hardware components, such as processor 510, connection 505, output device 535, etc., to carry out the function.

For clarity of explanation, the illustrative system embodiment is presented as including individual functional blocks including functional blocks labeled as a "processor" or processor 510. The functions these blocks represent may be provided through the use of either shared or dedicated hardware, including, but not limited to, hardware capable of executing software and hardware, such as a processor 510, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations discussed below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 can practice all or part of the recited methods, can be a part of the recited systems, and/or can operate according to instructions in the recited non-transitory computer-readable storage media. Such logical operations can be implemented as modules configured to control the processor 420 to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A noise attenuation system comprising:
one or more processors; and
a memory coupled to the one or more processors, with instructions stored therein which, when executed by the one or more processors, cause the one or more processors to perform operations comprising:
receiving a set of audio segments from an audio capture device, the set of audio segments including a plurality of features,
analyzing the set of audio segments to yield a plurality of scores, comprising:
first applying a first machine learning model to determine a first probability that the set of audio segments includes one or more undesired features of the plurality of features;
second applying, in response to the first probability exceeds a first threshold, a second machine learning model to determine a second probability that the set of audio segments includes one or more undesired features of the plurality of features; and
attenuating, in response to the second probability exceeds a second threshold higher than the first threshold, at least one of the plurality of features.

2. The noise attenuation system of claim 1, wherein the attenuating includes:
identifying an audio artifact from among the plurality of features,
attenuating a volume of the audio artifact, and
buffering the at least one of the plurality of features.

3. The noise attenuation system of claim 2, wherein the operations include retrieving the at least one of the plurality of features from the buffer for insertion into an audio channel using time squeezing.

4. The noise attenuation system of claim 1, wherein the operations include receiving another set of audio segments from the audio capture device when the second probability does not exceed the second threshold.

5. The noise attenuation system of claim 1,
wherein,
the first probability is determined using a logistic regression model, and
the second probability is determined using a deep neural network.

6. The noise attenuation system of claim 1, wherein the operations include receiving another set of audio segments from the audio capture device when the first probability does not exceed the first threshold.

7. A computer-implemented method comprising:
receiving a set of audio segments from an audio capture device, the set of audio segments including a plurality of features;
analyzing the set of audio segments to yield a plurality of scores, comprising:
first applying a first machine learning model to determine a first probability that the set of audio segments includes one or more undesired features of the plurality of features;
second applying, in response to the first probability exceeding a first threshold, a second machine learning model to determine a second probability that the set of audio segments includes one or more undesired features of the plurality of features; and
attenuating, in response to the second probability exceeding a second threshold higher than the first threshold, the at least one of the plurality of features based on at least one of the plurality of scores and a threshold.

8. The computer-implemented method of claim 7, wherein the attenuating includes:
identifying an audio artifact from among the plurality of features,
attenuating a volume of the audio artifact, and
buffering the at least one of the plurality of features.

9. The computer-implemented method of claim 8, further comprising:
retrieving the at least one of the plurality of features from the buffer for insertion into an audio channel using time squeezing.

10. The computer-implemented method of claim 7, further comprising:
receiving another set of audio segments from the audio capture device when the second probability does not exceed the second threshold.

11. The computer-implemented method of claim 7, wherein,
the first probability is determined using a logistic regression model, and
the second probability is determined using a deep neural network.

12. The computer-implemented method of claim 7, wherein further comprising receiving another set of audio segments from the audio capture device when the first probability does not exceed the first threshold.

13. A non-transitory computer-readable storage medium comprising instructions stored therein which, when executed by one or more processors, cause the one or more processors to perform operations comprising:
receiving a set of audio segments from an audio capture device, the set of audio segments including a plurality of features;
analyzing the set of audio segments to yield a plurality of scores, comprising:
first applying a first machine learning model to determine a first probability that the set of audio segments includes one or more undesired features of the plurality of features;
second applying, in response to the first probability exceeds a first threshold, a second machine learning model to determine a second probability that the set of audio segments includes one or more undesired features of the plurality of features; and
attenuating, in response to the second probability exceeds a second threshold higher than the first threshold, the at least one of the plurality of features based on at least one of the plurality of scores and a threshold.

14. The non-transitory computer-readable storage medium of claim 13, wherein the attenuating includes:
identifying an audio artifact from among the plurality of features,
attenuating a volume of the audio artifact, and
buffering the at least one of the plurality of features.

15. The non-transitory computer-readable storage medium of claim 14, wherein the operations include retrieving the at least one of the plurality of features from the buffer for insertion into an audio channel using time squeezing.

16. The non-transitory computer-readable storage medium of claim 14, wherein the operations include receiving another set of audio segments from the audio capture device when the first probability does not exceed the first threshold.

17. The non-transitory computer-readable storage medium of claim 13, wherein the operations include receiving another set of audio segments from the audio capture device when the second probability does not exceed the second threshold.

\* \* \* \* \*